US012779647B2

(12) United States Patent
Vaculik et al.

(10) Patent No.: US 12,779,647 B2
(45) Date of Patent: Nov. 3, 2026

(54) SYSTEMS AND METHODS FOR SENSORS FOR AN IMPACT TOOL

(71) Applicant: Milwaukee Electric Tool Corporation, Brookfield, WI (US)

(72) Inventors: Tanner J. Vaculik, Brown Deer, WI (US); Kyle W. Schultz, Mequon, WI (US); Mackenzie J. Nick, Brookfield, WI (US); Spencer D Stingl, Wauwatosa, WI (US); Peter Zhou, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 19/261,903

(22) Filed: Jul. 7, 2025

(65) Prior Publication Data

US 2026/0008166 A1 Jan. 8, 2026

Related U.S. Application Data

(60) Provisional application No. 63/705,693, filed on Oct. 10, 2024, provisional application No. 63/668,651, filed on Jul. 8, 2024.

(51) Int. Cl.

*B25D 9/04* (2006.01)
*B25D 11/12* (2006.01)
*B25D 16/00* (2006.01)

(52) U.S. Cl.

CPC ............... *B25D 9/04* (2013.01); *B25D 16/00* (2013.01); *B25D 2250/141* (2013.01); *B25D 2250/221* (2013.01)

(58) Field of Classification Search

None

See application file for complete search history.

(56) References Cited

U.S. PATENT DOCUMENTS

| | | | |
|---|---|---|---|
| 4,088,418 | A | 5/1978 | Dann |
| 4,284,374 | A | 8/1981 | Senzaki |
| 4,309,042 | A | 1/1982 | Fauth et al. |
| 4,694,944 | A | 9/1987 | Schmidt |
| 4,708,548 | A | 11/1987 | Taylor et al. |
| 8,622,401 | B2 | 1/2014 | Puzio et al. |
| 8,820,431 | B2 | 9/2014 | Puzio et al. |
| 9,067,266 | B2 | 6/2015 | Puzio et al. |
| 10,080,568 | B2 | 9/2018 | Estes |
| 2009/0160138 | A1 | 6/2009 | Bohne |

(Continued)

FOREIGN PATENT DOCUMENTS

| | | | |
|---|---|---|---|
| DE | 3434112 | C2 | 11/1987 |
| DE | 3439668 | C2 | 5/1993 |

(Continued)

*Primary Examiner* — Tanzim Imam

(74) *Attorney, Agent, or Firm* — Quarles & Brady LLP

(57) ABSTRACT

A method of detecting positions of a striker for a rotary impact tool is provided. A first position of the striker can be determined before impacting an anvil of the rotary impact tool along an axial direction of the rotary impact tool. A second position of the striker can be determined after impacting the anvil along the axial direction. Operation of the rotary impact tool can be controlled based on the first position and the second position.

18 Claims, 11 Drawing Sheets

(56) References Cited

U.S. PATENT DOCUMENTS

| | | | | |
|---|---|---|---|---|
| 2014/0318821 | A1* | 10/2014 | Wyler | B25F 5/006 173/104 |
| 2018/0361552 | A1* | 12/2018 | Hartmann | B25D 11/125 |
| 2021/0291338 | A1* | 9/2021 | Marsh | B25D 11/04 |
| 2022/0032437 | A1* | 2/2022 | Didier | B25D 11/04 |
| 2022/0324090 | A1* | 10/2022 | Kendall | B25D 16/006 |
| 2022/0371172 | A1* | 11/2022 | Thorson | B25D 17/06 |
| 2024/0408734 | A1* | 12/2024 | Witzigreuter | B25D 11/10 |

FOREIGN PATENT DOCUMENTS

| | | | | |
|---|---|---|---|---|
| EP | 1607186 | A1 * | 12/2005 | B25D 11/125 |
| EP | 1533057 | B1 | 6/2007 | |
| EP | 2689895 | B1 | 3/2017 | |

* cited by examiner

SYSTEMS AND METHODS FOR SENSORS FOR AN IMPACT TOOL

CROSS-REFERENCE TO RELATED APPLICATIONS

This application is based on, and claims priority to, and incorporates herein by reference in its entirety, U.S. Provisional Application Ser. No. 63/668,651, filed Jul. 8, 2024, and U.S. Provisional Application Ser. No. 63/705,693, filed Oct. 10, 2024.

BACKGROUND

A power tool (e.g., a rotary hammer, an air hammer, a drill, air chisel, etc.) can be used to drill or impact a workpiece with a bit (e.g., to remove material from the workpiece). An output unit of the power tool can include an impact mechanism that provides power to translate the bit in an axial (i.e., linear) direction. For example, in some applications, the impact mechanism can include a striker that translates in the axial direction to deliver an impact to a tool bit (e.g., via an anvil).

SUMMARY

Some embodiments of the disclosed technology provide a method of detecting positions of a striker for a rotary impact tool. A first position of the striker can be determined before impacting an anvil of the rotary impact tool along an axial direction of the rotary impact tool. A second position of the striker can be determined after impacting the anvil along the axial direction. Operation of the rotary impact tool can be controlled based on the first position and the second position.

In some examples, determining the first position or the second position can include generating a magnetic field that the striker passes through and detecting a change in the magnetic field.

In some examples, generating the magnetic field can include producing an output voltage that is associated with the first position or the second position.

In some examples, the striker can pass through the magnetic field as a spindle housing of the rotary impact tool rotates about an axis that extends in the axial direction.

In some examples, controlling the operation can include calculating an impact energy of the striker based on the first position and the second position.

In some examples, controlling the operation can further include modulating power to an impact mechanism of the rotary impact tool to propel the striker.

In some examples, determining the first position of the striker or the second position can include detecting the first position or the second position, respectively, relative to time.

In some examples, the method can further include determining pressure within a spindle housing that the striker is positioned within.

Some embodiments of the disclosed technology provide a power tool. The power tool can include a spindle, a piston that reciprocates within the spindle, a striker movably received within the spindle to form an air spring with the piston, and a sensor positioned around the spindle to detect the striker as the striker reciprocates within the spindle. The striker can reciprocate in response to reciprocation of the piston.

In some examples, the sensor can include a bobbin and a plurality of coils wrapped on the bobbin, the bobbin defining a bore that receives the spindle.

In some examples, the bore can define an inner diameter that is greater than an outer diameter of the spindle, the spindle rotating relative to the sensor within the bore.

In some examples, the plurality of coils can include a first coil that is wrapped on the bobbin in a first rotational direction and one or more of: a second coil that is wrapped on the bobbin in a second rotational direction that is opposite the first rotational direction, or a third coil that is wrapped on the bobbin in the second rotational direction.

In some examples, the plurality of coils can include the second coil and the third coil, and the first coil can be positioned between the second coil and the third coil.

In some examples, the striker can define a first axial length and the first coil can define a second axial length that is less than the first axial length.

In some examples, a turn ratio of the first coil to at least one of the second coil and the third coil can be between about 0.1 and about 10.0.

In some examples, the sensor can include a shield that is configured to cover the plurality of coils.

In some examples, the power tool can further include a controller configured to determine at least one of an impact energy of the striker and a pressure within the spindle based on at least one of a detected position and a detected velocity of the striker by the sensor.

According to yet another aspect of the present disclosure, a power tool can include a housing, a motor disposed in the housing, a spindle coupled to the housing and defining a longitudinal axis, a reciprocation assembly driven by the motor and including a striker movably received within a first portion of the spindle, an anvil movably received in a second portion of the spindle, the anvil moving along the longitudinal axis to contact the striker, and a sensor coupled to the housing and coaxially aligned with the spindle, the sensor being radially spaced from the first portion of the spindle and configured to detect movement of the striker along the longitudinal axis.

In some examples, the sensor can generate a magnetic field and the striker can induce a change in the magnetic field as the striker passes through the magnetic field.

In some examples, the change in the magnetic field can produce an output voltage at the sensor that corresponds to a position of the striker along the longitudinal axis.

BRIEF DESCRIPTION OF THE DRAWINGS

The accompanying drawings, which are incorporated in and form a part of this specification, illustrate embodiments of the disclosed technology and, together with the description, serve to explain the principles of embodiments of the disclosed technology.

DETAILED DESCRIPTION

Figure 1:
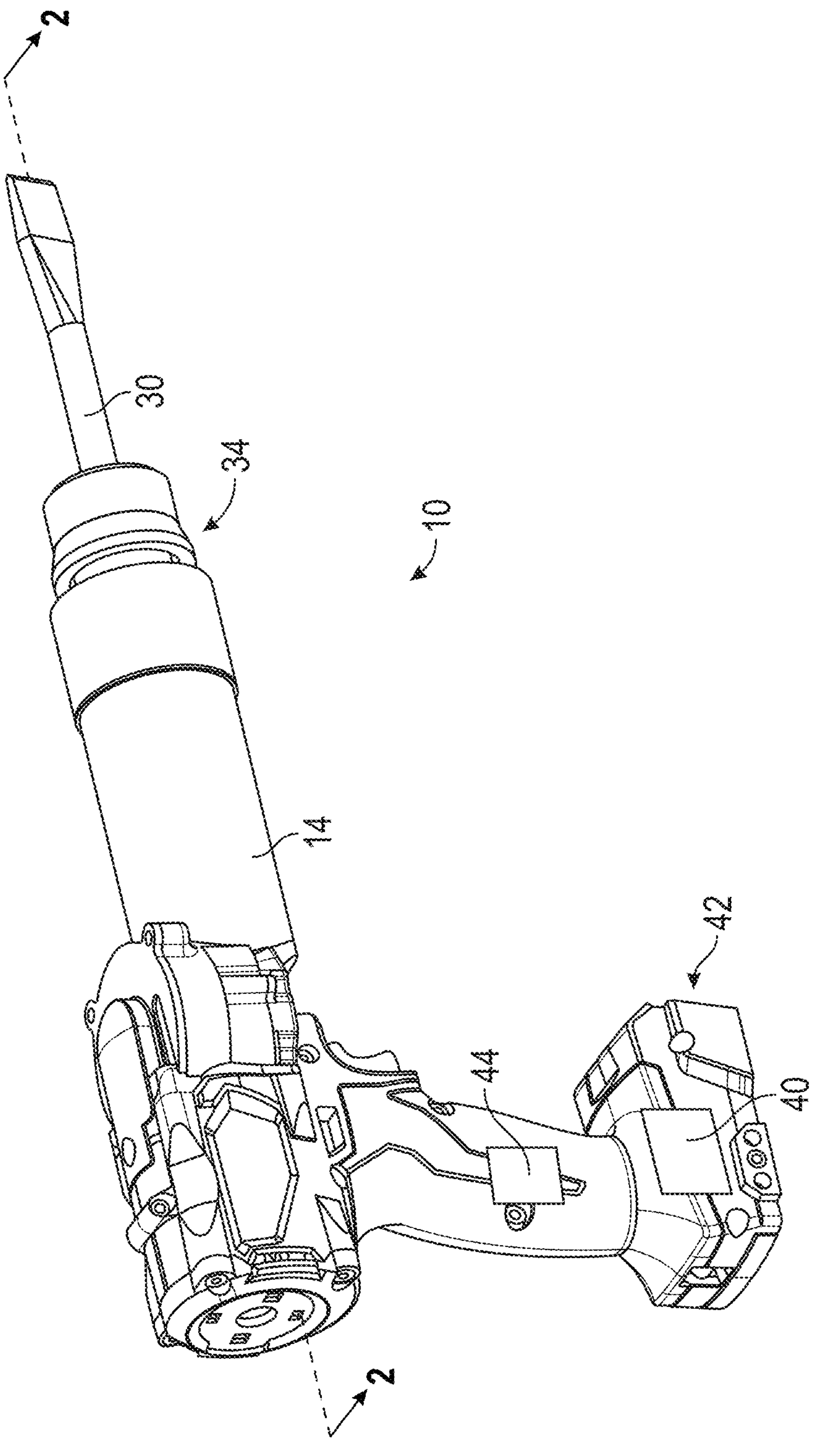
FIG. 1 is an axonometric view of an example power tool.

The following discussion is presented to enable a person skilled in the art to make and use embodiments of the disclosed technology. Given the benefit of this disclosure, various modifications to the illustrated embodiments will be readily apparent to those skilled in the art, and the principles herein can be applied to other embodiments and applications without departing from embodiments of the disclosed technology. Thus, embodiments of the disclosed technology are not intended to be limited to embodiments shown but are to be accorded the widest scope consistent with the principles and features disclosed herein.

The following detailed description is to be read with reference to the figures, in which like elements in different figures have like reference numerals. The figures, which are not necessarily to scale, depict selected embodiments and are not intended to limit the scope of embodiments of the disclosed technology. Skilled artisans will recognize the examples provided herein have many useful alternatives and fall within the scope of embodiments of the disclosed technology.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As generally noted above, a power tool (e.g., a rotary hammer, demolition hammer, hammer chisel, etc.) can be provided with an impact mechanism that can provide impacts (e.g., axial impacts) to a tool bit. The impact mechanism can include a piston that moves between extended and retracted position within a chamber of a spindle. In some applications (e.g., a rotary hammer), the spindle can rotate about a drive axis to further cause a rotation of the bit. Within the chamber, a striker can be positioned between an end of the piston and the tool bit to form an air cushion (e.g., an air spring or an air pocket) therebetween. Extension of the piston into the chamber can cause pressure within the chamber (e.g., of the air cushion) to increase. This increase in pressure causes the striker to move forward in a linear direction (e.g., in the direction of extension of the piston, along a drive axis of the power tool). The striker can impact an anvil, which in turn contact the tool bit to cause a bit that is secured to the anvil to impact a workpiece. In some examples, the striker may contact the tool bit to impart an impact.

The present disclosure provides a power tool with a sensor that provides an improved operation of the power tool as compared to conventional approaches. For example, in some cases, a power tool can include a sensor that is configured to measure impact energy during tool operation. The measured impact energy can be used to control a motor speed to achieve a predetermined impact energy. For example, during a warm-up phase, tool components or lubricants (e.g., grease, oil, etc.) may be below a desired operating temperature and have increased viscosity, which results in decreased impact energy. The sensor can measure the impact energy which can then be accommodated for an increasing motor speed. For example, the sensor can communicate a signal indicative of impact energy (e.g., a striker speed before and after impact, a striker position over time, coefficient of restitution, spindle pressure, etc.) to a controller that can determine the impact energy and adjust an output parameter (e.g., torque, speed, etc.) to achieve the desired impact energy. The desired impact energy can be correlated with another operating parameter, such as a coefficient of restitution, spindle pressure, etc. In some cases, measured impact energy can be used to estimate tool wear so that an indication can be given to a user that service is required to maintain optimal performance of the power tool. In some cases, a sensor can determine a coefficient of restitution (i.e., a rebound coefficient) of the power tool. By measuring the coefficient of restitution, a tool can automatically adjust motor operation to maintain a desired coefficient of restitution, as may allow the tool to optimized performance for different types of workpieces.

In some examples, a sensor (e.g., a sensor assembly) can include a linear distance sensor, such as a linear variable differential transformer (LVDT), to detect movements of various components of the power tool. The sensor can be positioned on or within a gearcase or a tool housing such that the sensor can detect positions of one or more components (e.g., a striker, an anvil, a piston, etc.) as the one or more components move past the sensor. In some examples, the sensor can include coils that generate a magnetic flux based on a movement of the one or more components. In some examples, the sensor can output a voltage value based on a change in the magnetic flux, and the output voltage can indicate a position or a displacement of the one or more components. In some applications, the sensor can sense the displacement of a striker and determine velocity to characterize the striker behavior (e.g., by calculating impact energy, a coefficient of restitution, etc.) or to measure pressure within a spindle (e.g., by calculating a volume within the spindle based on striker position and piston position, the latter of which can be determined, for example, based on the geometry of the impact mechanism or a sensed position of the piston). In some applications, based on the determined characteristics, a controller can modulate behaviors of the striker (e.g., providing more power to the piston to increase speed of the striker or less power to decrease speed of the striker) to improve operation of the power tool. In some cases, determined pressure values can be used to indicate wear of the power tool over time to extend or maintain tool life or tool performance. For example, the seals between the spindle and each of the piston and the striker can wear over time, which can result in blowby that reduces maximum cylinder pressure. Because the cylinder pressure can be measured during use, an indication can be made to a user that maintenance is required. Similarly, an indication can be made to a user if an overpressure condition of the cylinder is reached.

Figure 2:
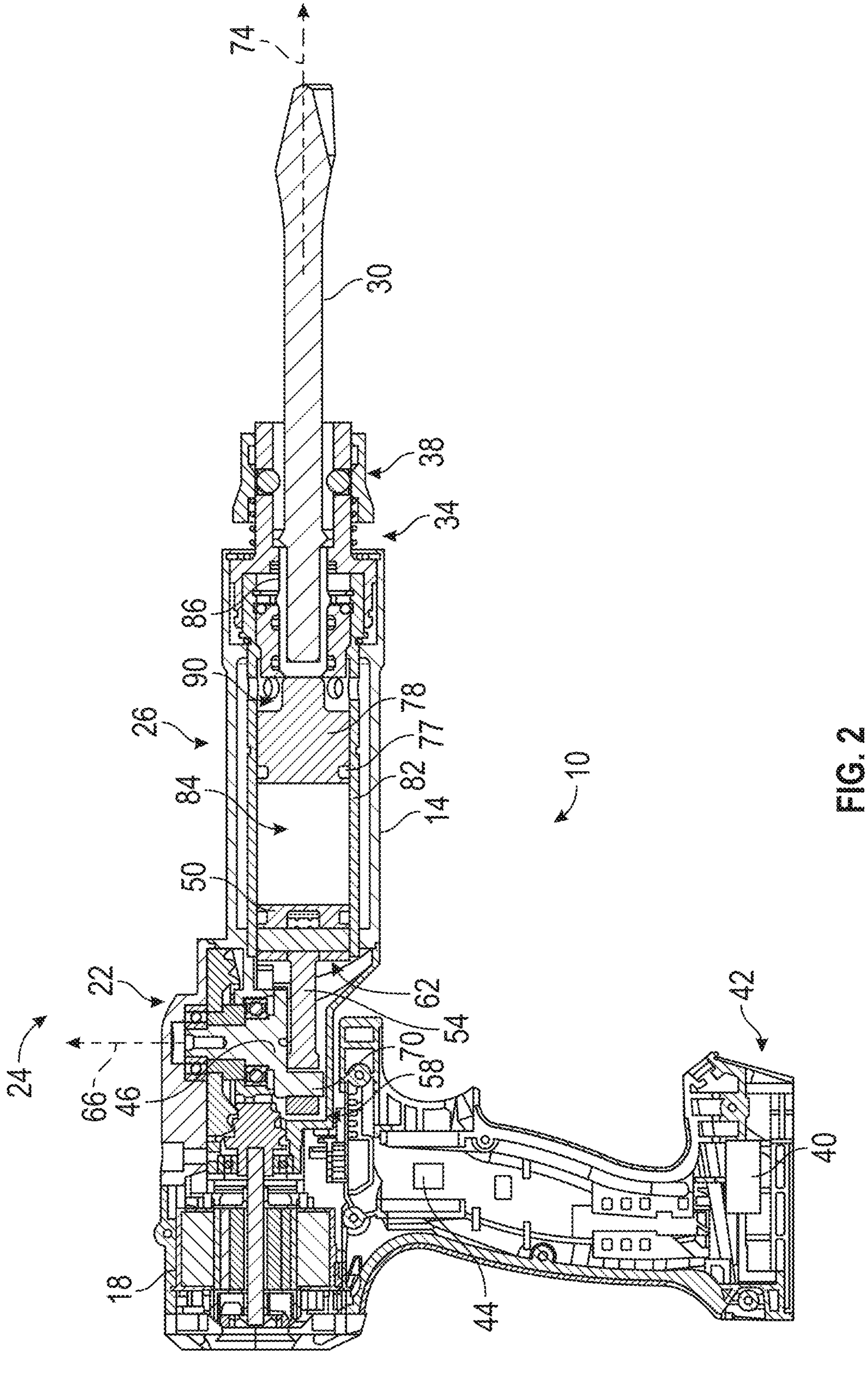
FIG. 2 is a side cross-sectional view of the power tool of FIG. 1 taken along line 2-2 of FIG. 1.

Generally, examples of the disclosed technology can be implemented on any variety of power tools that operate with removable bits. In particular, some examples may be used with impact drivers, including rotary hammers, chisel hammers or other known implementations. In this regard, for example, FIGS. 1-2 illustrate a power tool 10 in the form of a hammer tool (e.g., chisel hammer). The power tool 10 can include a housing 14 and a motor 18 disposed within the housing 14. The power tool 10 can further include a reciprocation drive assembly 22 (shown in FIG. 2) coupled to the motor 18 for converting torque from the motor 18 to reciprocating motion. An impact mechanism 26 can be coupled to the reciprocation drive assembly 22 to impart repeating axial impacts on a tool bit 30 (e.g., a chisel bit or an output tool) via a transmission 24. As shown in FIG. 1, the tool bit 30 may be slidably supported by a tool holder 34 coupled to the housing 14 so that the tool bit 30 is permitted to translate along its axis to impart the axial impacts to a work piece. In the illustrated construction, the power tool 10 includes a quick-connect mechanism 38 coupled to the tool holder 34 to facilitate quick removal and replacement of different tool bits 30. In other applications, other types of chucks can be used in place of the quick-connect mechanism 38, as may allow for tooled or toolless bit changes.

Referring in particular to FIG. 2, in the illustrated construction of the power tool 10, the motor 18 can be configured as a direct-current (DC) motor 18 that receives power from an on-board power source (e.g., a battery pack 40). The housing 14 can define a battery receptacle 42 that detachably receives the battery pack 40. The battery pack 40 may include any of a number of different nominal voltages (e.g., 12V, 18V, etc.), and may be configured having a Lithium-based chemistry (e.g., Lithium, Lithium-ion, etc.) or any other suitable chemistry. Alternatively, the motor 18 may be powered by a remote power source (e.g., a household electrical outlet) through a power cord or the motor 18 can be a different type of motor, such as an alternating-current (AC) motor. The motor 18 is selectively activated by depressing a trigger which, in turn, actuates an internal switch. The switch may be electrically connected to the motor 18 via a top-level or master controller 44 (e.g., a microcontroller), or one or more circuits, for controlling operation of the motor 18.

With continued reference to FIG. 2, the reciprocation drive assembly 22 can be configured to convert rotational motion of the motor 18 (e.g., via the transmission 24) into reciprocating linear motion of a piston. In the illustrated example, the reciprocation drive assembly 22 can be configured as a slider crank mechanism that includes a crankshaft 46, a reciprocating piston 50, and a connecting rod 54. The connecting rod 54 is pivotably coupled to the crankshaft 46 at a first end 58 and pivotably coupled to the piston 50 at a second end 62. The crankshaft 46 can be configured to receive torque from the motor 18 and rotate about a crankshaft axis 66. The crankshaft 46 can include a crank pin 70 that couples to the first end 58 of the connecting rod 54. Correspondingly, as the crankshaft 46 rotates about the crankshaft axis 66, the connecting rod 54 drives the piston 50 to reciprocate along a reciprocation axis 74 and within a spindle 82 (e.g., a barrel) supported within the housing 14. In some cases, the spindle 82 is stationary, while in other examples, such as rotary hammers, the spindle 82 can be rotated by the motor 18 to cause rotation of a tool bit.

In some embodiments, the reciprocation drive assembly 22 can be realized by other mechanisms, including those known in the art to convert rotational motion to reciprocating motion (e.g., a scotch-yoke mechanism, a wobble drive mechanism, a swash plate mechanism, etc.). In this regard, although the various tool holders discussed below may be utilized in combination with the illustrated reciprocation drive assembly 22, various other implementations are also possible.

A reciprocation assembly moves to generate impact to a tool bit via an impact mechanism. That is, the impact mechanism moves in response to movement of the reciprocation assembly to impact a tool bit. In the illustrated example, the impact mechanism 26 includes a striker 78 and an anvil 86 that are moveably received in the spindle 82. The striker 78 is positioned between the piston 50 and the anvil 86 and selectively reciprocates toward the tool bit 30. The impact between the striker 78 and the anvil 86 can be transferred to the tool bit 30, causing the anvil 86 to reciprocate for performing work on a work piece. Further, in the illustrated construction of the power tool 10, the spindle 82 is hollow and defines an interior chamber 90 (e.g., a bore) in which the striker 78 is received. An air spring 84 (e.g., an air pocket or an air cushion) can be developed between the piston 50 and the striker 78 when the piston 50 reciprocates within the spindle 82, whereby expansion and contraction of the air spring 84 induces reciprocation of the striker 78. That is, as the piston 50 moves towards the striker 78, the volume of the air spring 84 is reduced, which increases pressure within the air spring 84. This increase in pressure can be sufficient to move the striker 78 in the same direction as the piston 50 and cause the striker 78 to impact the anvil 86 to deliver an impact to a workpiece via the tool bit 30. Conversely, as the piston 50 moves away from the striker 78, the volume of the air spring 84 can increase, which reduces pressure within the air spring 84. This reduction in pressure can be sufficient to move the striker 78 in the same direction as piston 50, causing the striker 78 to retract and move away from the anvil 86.

In some cases, the striker 78 or the anvil 86 can form a seal against an interior surface of the spindle 82 via one or more sealing rings (e.g., an O-ring 77). In some examples, maintaining the seal between the striker 78 and the spindle 82 can help to maintain the air spring 84 formed within the interior chamber 90. In some configurations, the spindle 82 can include openings (e.g., on a piston side of the spindle 82) that can allow for “make-up” air to be provided in the interior chamber 90 if air is lost across the O-ring 77 during reciprocation of the piston 50. That is, if a seal between the striker 78 and the piston 50 breaks and allows air to escape, replacement air can enter through the openings to form the air spring 84.

In some non-limiting cases, the motor 18 can be positioned within the housing 14 (e.g., within a gearcase disposed within the housing 14), and the spindle 82 can be coupled to the housing 14 (e.g., so that the spindle 82 is rotationally fixed to the housing and does not rotate). In some non-limiting cases, the motor 18 can be positioned within the housing 14, and the spindle 82 can be rotatable. For example, the transmission 24 between the motor 18 and the spindle 82 can transmit torque from the motor 18 to the spindle 82, causing the spindle 82 to rotate when the motor 18 is activated. The transmission 24 can include a geartrain, although other types of transmission systems can be used, for example, belt drives, chain drives, etc.

Figure 3:
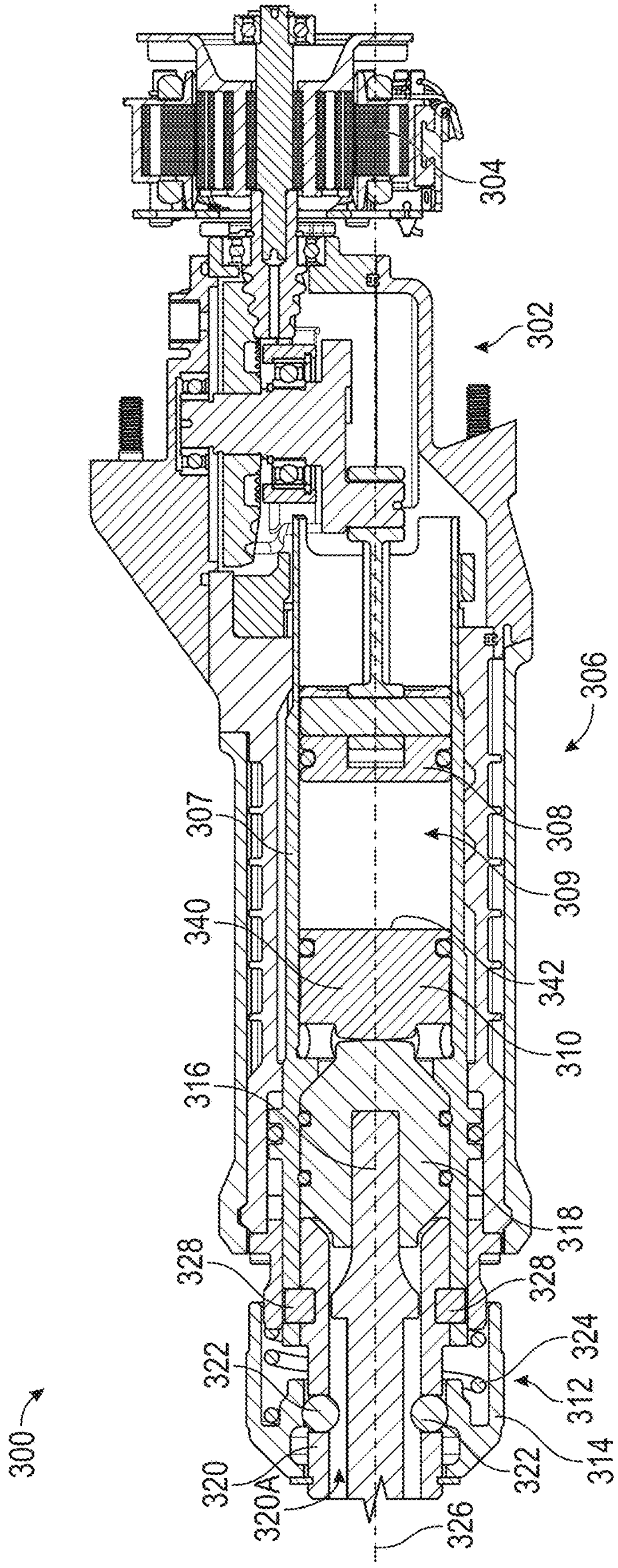
FIG. 3 is a side cross-sectional view of a tool head of another example power tool.

FIG. 3 illustrates an example of a tool head 300 (e.g., an output assembly) of a power tool (e.g., a chisel hammer, a rotary hammer, a drill, etc.), which can be implemented as a particular example of a tool head of the power tool 10 of FIGS. 1 and 2. Similar to the tool head of the power tool 10 described above, the tool head 300 can include similar components and functions to the tool head of FIGS. 1 and 2. Thus, like names to designate the same or similar components described above will be used where applicable, and discussion of these components above generally applies relative to the examples below. For example, the tool head 300 has an impact mechanism 306 just as the tool head of FIGS. 1 and 2 has the impact mechanism 26.

In particular, the tool head 300 can include a reciprocation drive assembly 302 that engages with a motor 304 to convert torque from the motor 304 to linear reciprocating motion. The reciprocation drive assembly 302 engages with an impact mechanism 306 to transfer the reciprocating motion as impact energy for performing work on a work piece. For example, the impact mechanism 306 can include a piston 308 that is secured to the reciprocation drive assembly 302 and a striker 310 that is moved (e.g., propelled) by the piston 308 (e.g., via compression and decompression of an air pocket 309 formed therebetween). Within a spindle 307 (e.g., a spindle housing) that defines a chamber 307A, the piston 308 can translate linearly along an axis 326 and deliver the impact energy from the reciprocation drive assembly 302 to the striker 310. The striker 310 can move linearly along the axis 326 and transfer the impact energy to a bit 316 (e.g., via contact with an anvil at a first end 340 of the striker 310, as described above), which may be secured to a tool holder 312.

The tool holder 312 can include an anvil 318 that is shaped and sized to receive the bit 316. The bit 316 can extend through a guide channel 320A defined by a shaft 320 (e.g., a front spindle portion) of the tool holder 312 and move along the axis 326 to be inserted into the tool holder 312 or removed from the tool holder 312. For convenience of discussion, an insertion direction of the bit 316 is generally along a first direction (e.g., toward the anvil 318) along the axis 326, and a removal direction of the bit 316 is generally along a second direction (e.g., away from the anvil 318) along the axis 326 that is opposite the first direction. It is appreciated that the tool holder 312 can be used in a variety of orientations. In the illustrated example, the shaft 320 is coupled to the spindle 307 via pins 328 (e.g., fasteners, retention members, pins including various types of materials, different types of fasteners, etc.).

The shaft 320 can include slots that extend into the guide channel 320A and that can receive detents 322 (e.g., ball detents or other retention members, including pins, blocks, etc.) that move within the slots. For example, in a locked configuration (shown in FIG. 3), the detents 322 can be disposed relatively close to the axis 326 to limit a pathway for the bit 316 to translate linearly out of the tool holder 312, and can thereby retain the bit 316 within the guide channel 320A. In an unlocked configuration, the detents 322 can be moved radially away from the axis 326 to open a pathway for the bit 316 to translate linearly into and out of the tool holder 312.

In particular, the tool holder 312 can include a chuck collar 314 that can be placed over the shaft 320 and engage with the detents 322 in locked and unlocked configurations. In the locked configuration, the detents 322 are urged into the guide channel 320A to retain the bit 316 in the tool head 300. In the unlocked configuration, the detents 322 are permitted to move out of the guide channel 320A to allow the bit 316 to be removed from the tool head 300 (e.g., via translation in the removal direction). In some examples, a spring 324 is provided between a housing of the power tool and the chuck collar 314 to bias movement of the chuck collar 314 (e.g., into the locked configuration). As shown in FIG. 3, the spring 324 is extended, and the detents 322 are within the slots of the shaft 320. Thus, pulling out the bit 316 from the tool holder 312 may be limited by the detents 322, due to a distance between the detents 322 being smaller than a largest width of the bit 316. When the chuck collar 314 is moved in the insertion direction and the spring 324 is correspondingly compressed, the detents 322 can be aligned with sockets formed in the chuck collar 314. Thus, the detents 322 can be moved radially outward into the sockets and thereby provide clearance for the bit 316 to move along the axis 326 (e.g., to be removed or re-inserted). In other examples, the chuck collar 314 can be moved differently to attain the unlocked configuration, for example, by moving along the insertion direction or by rotation about the axis 326. Further, while a distal end of the bit 316 is not fully shown in FIG. 3 for clarify of presentation, the bit 316 can have a variety of lengths and shapes at the distal end.

Figure 4:
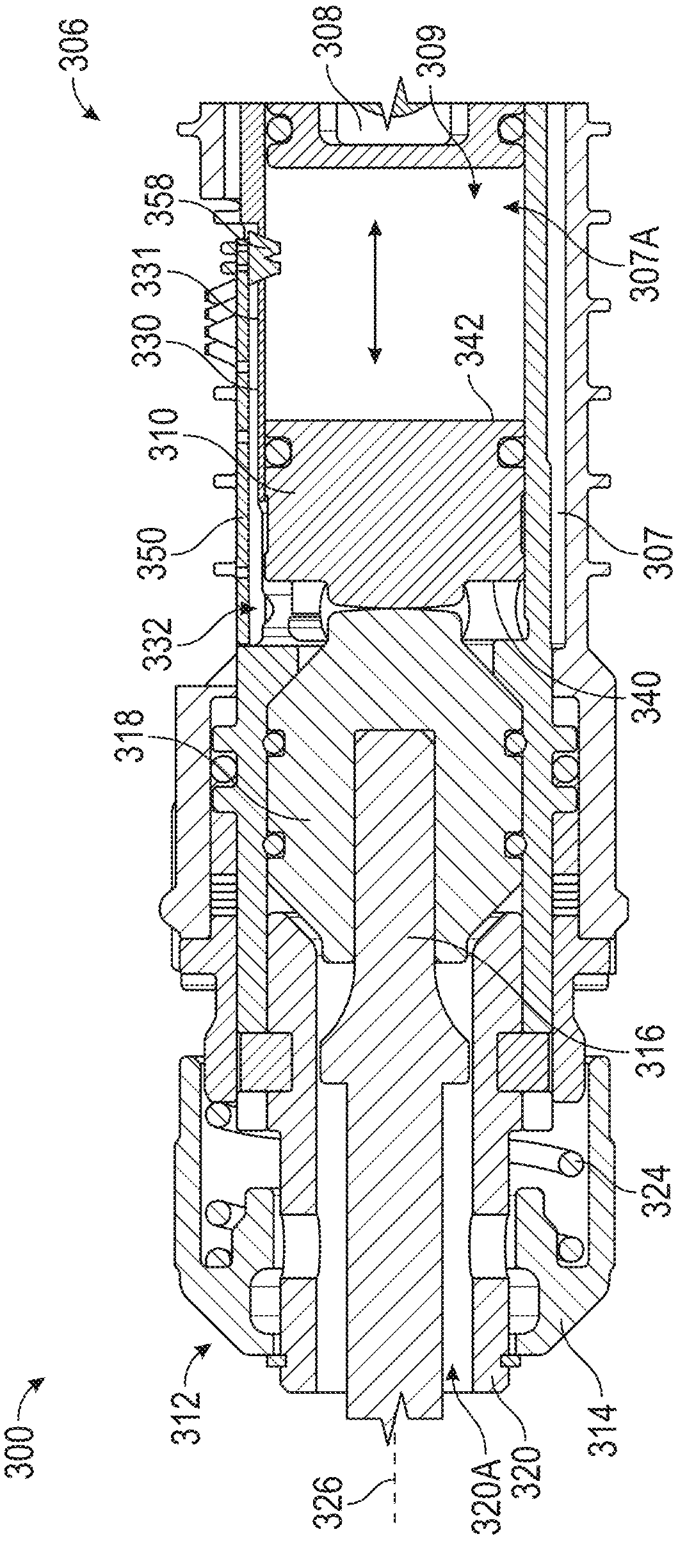
FIG. 4 is a side cross-sectional partial view of a power tool according to aspects of the present disclosure.
Figure 5:
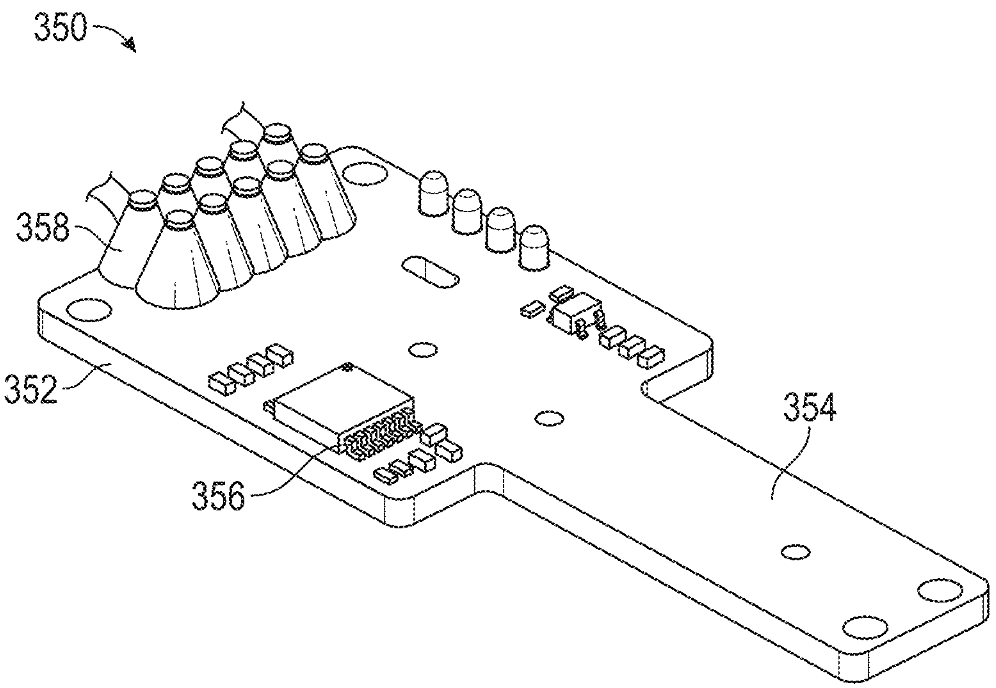
FIG. 5 is an axonometric view of a sensor according to aspects of the present disclosure.

In some cases, a power tool can include a sensor to determine impact energy or a coefficient of restitution during operation of the power tool. For example, as shown in FIGS. 4 and 5, the power tool can include a sensor 356 configured to detect movement of the striker 310 within the chamber 307A. In some cases, the sensor 356 can be configured as a sensor assembly 350 that includes a board 352 (shown in FIG. 5) onto which the sensor 356 can be mounted or coupled to the spindle 307. For example, the sensor 356 can be positioned in a recessed portion 330 of the spindle 307. Pins 358 can be provided to secure the sensor 356 to an exterior annular surface 331 of the spindle 307 (e.g., by extending the pins 358 through the board 352). Additionally or alternatively, the board 352 can include a plurality of apertures that can be configured to receive fasteners to secure the board 352 to the spindle 307. The sensor 356 can also be secured using other methods, such as with an adhesive, press-fit connection, snap-fit connection, welding, etc.

With specific reference to FIG. 4, the spindle 307 can optionally include a window 332 (e.g., an opening or an air gap) that permits the sensor assembly 350 to detect a position of the striker 310 through the window 332. The board 352 can include an arm 354 (shown in FIG. 5) that extends over the window 332, such that a portion of the sensor assembly 350 can engage with various components within the chamber 307A. In some examples, the sensor assembly 350 can detect a leading edge of the striker 310 at the first end 340. In some examples, an outer surface of the striker 310 (e.g., at the first end 340) can include one or more protrusions (e.g., ribs) that the sensor assembly 350 can detect (e.g., through the window 332). In the illustrated example, the sensor 356 is configured to detect the striker 310 at the first end 340, while in other examples, the sensor 356 can be configured to detect the striker 310 at a second end 342 that is opposite the first end 340.

In the present example, the sensor assembly 350 can include the sensor 356 (shown in FIG. 5) that is an inductive sensor. However, the sensor assembly 350 can include different types of sensors (e.g., a magnetic sensor) or positioned on different parts of the tool head 300 to sense positions of different components (e.g., the anvil 318) of the power tool. In some cases, the sensor assembly 350 can be a sensor array that includes one or more types of sensors (e.g., Hall effect sensors, current sensors, position sensors, voltage sensors, temperature sensors, torque sensors, light sensors, pressure sensors, capacitive sensors, tilt sensors, etc.). Further, the power tool can be provided with more (e.g., two, three, four, etc.) sensor assemblies to detect positions of one or more components of the power tool.

In the present example, the striker 310 can maintain a sealing interface with an inner wall of the spindle 307 during operation. The striker 310 includes the first end 340 that is oriented toward and configured to contact the anvil 318, and the second end 342 that is oriented toward the piston 308. The second end 342 can include a sealing element (e.g., an O-ring) to provide a sealing engagement with the spindle 307. The window 332 (e.g., the air gap) can be positioned such that the sealing engagement is maintained as the first end 340 of the striker 310 translates across the window 332. Thus, the chamber 307A behind the striker 310 can remain enclosed (as the second end 342 provides the sealing interface to maintain the air pocket 309 enclosed within the chamber 307A) to permit the piston to translate along the axis 326 to pressurize the chamber 307A as desired. In some cases, the striker 310 can be defined by a length that is greater than a length of the window 332. Accordingly, when the striker 310 is moved to be in contact with the anvil 318, the window 332 is positioned between the second end 342 of the striker 310, as may maintain the seal between the striker 310 and the spindle 307. While the present embodiment illustrates the window 332 as an opening, some spindle housings can include a window that includes a piece of material including plastic, glass, or electrically conductive material (e.g., aluminum, copper, tin, carbon nanotube, etc.), and so on. Correspondingly, the window 332 may extend over a greater portion of the inner wall of the spindle 307. Thus, it may be possible for the sensor assembly 350 to detect a greater travel distance of the striker 310 across the chamber 307A.

Figure 6:
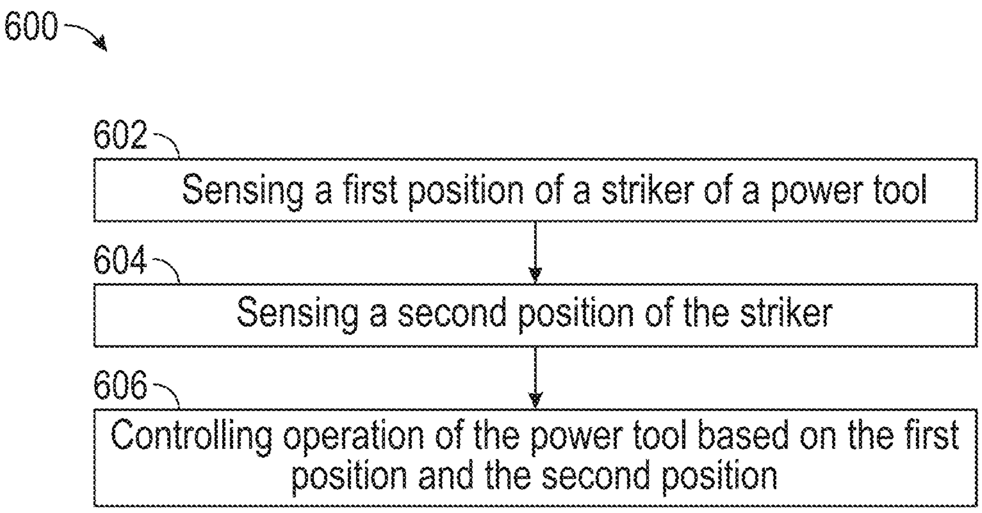
FIG. 6 is a flowchart of detecting positions of a striker of an impact tool according to aspects of the present disclosure.

FIG. 6 is an example flowchart illustrating a method 600 for detecting positions of a striker of a power tool using a sensor assembly such as the sensor assembly 350, although other types of sensor assemblies can be used. The method 600 generally refers to FIGS. 4 and 5 for brevity, but other power tools can be implemented to carry out the method 600. Although the flowchart illustrates blocks sequentially and in a particular order, in some examples, at least one or more blocks are executed at least partially in parallel, in another order, or bypassed.

At block 602, a first position of the striker 310 can be determined (e.g., before impacting the anvil 318). For example, the sensor 356 can be an inductive sensor that injects a current into a transmitting circuit trace to generate a magnetic field. As the striker 310 translates along the axis 326, the striker 310 can pass through the magnetic field, which causes Eddy currents to be generated in the striker 310. This Eddy currents generate a reactive a magnetic field that interacts with a receiving circuit trace and effects a change in the current therethrough. This change in current can then be used to indicate presence of the striker 310 at the sensor 356. Put differently, the sensor 356 uses the current induced in the receiving circuit traces by the reactive magnetic field to determine the presence or proximity of the striker 310 relative to the sensor assembly 350. In some cases, the induced current can also be used to determine a direction of travel of the striker 310.

In some embodiments, the receiving circuit trace can include two traces that are generally sinusoidal in shape (e.g., as sine wave, square wave, triangular wave, etc.) but offset by 90°. Thus, when the striker 310 translates, a voltage in one of the receiving circuit traces can be a sine wave and a voltage in the other receiving circuit trace can be a cosine wave. The voltage output of the two receiving traces can then be used by a controller to determine the location the striker with respect to the receiving circuit traces. In some examples, the voltage output can be used to determine an inductance (i.e., a ratio of the voltage output to a rate of change in the induced current) in the receiving circuit traces.

At block 604, a second position of the striker 310 can be determined (e.g., after impacting the anvil 318) similarly as at block 602. At block 606, operation of the power tool can be controlled (e.g., using a controller) based on the known first and second positions as determined at block 602 and the block 604, respectively. For example, the first and second positions of the striker 310 can be used to determine a velocity of the striker 310 before or after the impact can be determined for a period of time (e.g., between impacts, or a period of time from passing the sensor 356 before the impact and after the impact, etc.). In some examples, the determined velocity of the striker 310 can characterize tool performance or behaviors of the impact mechanism (e.g., while the power tool is being operated).

In particular, impact energy can be calculated based on a mass of the striker 310 and the velocity of the striker 310. The impact energy can indicate how much kinetic energy has been conserved after the impact and help determining an amount of energy delivered to a workpiece in an impact from the bit 316. Thus, the calculated impact energy can be used to modulate power delivered to the power tool to achieve a desired operating condition. In some cases, a speed of the motor 304 can be adjusted (e.g., by providing more or less power) to drive the piston 308 at a different speed. Correspondingly, the striker 310 can be propelled at a different speed to achieve a desired amount of impact energy.

In some applications, the power tool may be in a warm-up phase prior to operating the power tool to impact a workpiece. For example, the power tool may be below a desired operating temperature (e.g., by being in a cold environment which can cool lubricants in the power tool), which may decrease impact energy (e.g., due to increased losses associated with increase lubricant viscosities). The warm-up phase may permit the power tool to warm up and operate the power tool at a desired temperature to achieve a desired impact energy level. Thus, the sensor assembly 350 can help assessing whether changes in the impact energy level to adjust a motor speed of the power tool accordingly (e.g., to speed up the striker 310 to increase the impact energy or maintain a desired speed of the striker 310). In some examples, the sensor assembly 350 or a controller that receives sensor information from the sensor 356 can command or select a motor speed (e.g., via feedback control, user input, etc.) to influence the impact energy or control of the power tool.

Further, impact energy can be used to monitor wear of the power tool over time. For example, impact energy can decrease when grease leakage occurs within the power tool as energy becomes lost to friction. In some cases, impact energy can decrease when one or more seals (e.g., an O-ring on the striker 310) wear out and decrease the pneumatic seal within the chamber 307A. Thus, detecting the impact energy can signal an operator when it is appropriate to replace the seal or lubricate components (e.g., piston, seal, etc.) to maintain or improve performance of the power tool.

Further, a coefficient of restitution can be calculated based on the first and second velocities of the striker 310. In particular, the coefficient of restitution can be defined by a ratio of a velocity of the striker 310 after impacting the anvil 318 and a striker velocity before the impact. Thus, the coefficient of restitution can indicate elasticity of the collision. For example, a higher coefficient of restitution of the striker 310 may indicate that a higher amount of kinetic energy is conserved after the impact. In some examples, the coefficient of restitution may be influenced by various types of an impact surface of the bit 316, as the bit 316 may engage with different surfaces differently.

In that regard, the coefficient of restitution can help identifying various types of working surfaces or joints (e.g., concrete, mortise, tenon, ball, fasteners, etc.) during operations at the field (e.g., during a joint loosening such as in an automotive disassembly). In some applications, the coefficient of restitution may change during a joint removal. Correspondingly, the sensor assembly 350 or a controller that receives sensor information from the sensor 356 can communicate with the power tool (e.g., a master controller such as the master controller 44 of FIGS. 1 and 2) to optimize performance based on the coefficient of restitution from different joints or as the coefficient of restitution changes during a joint removal (e.g., to maintain a desired coefficient of restitution). For example, the power tool can provide more power to the impact mechanism to increase or maintain speed or throttle back on power to decrease speed to decrease rebound.

Continuing, the sensor assembly 350 can detect a position of an impact between the anvil 318 and the striker 310. For example, when the anvil 318 is moved (e.g., shuttled) forward within the chamber 307A (e.g., when the bit 316 is not pushed into a workpiece sufficiently to avoid dry firing), the striker 310 may need to travel farther forward. The sensor assembly 350 can sense this position of the striker 310 and help detecting a potential dry firing which can damage the power tool over time. Correspondingly, the sensor assembly 350 or a controller may communicate with the power tool to modulate speed of the motor to adjust (e.g., decrease) energy delivered to the impact mechanism. With decreased amount of impact to the anvil 318 or other parts of the power tool, the tool life can be preserved or maintained.

Further, a tool mode can be determined based on one or more characteristics (e.g., an impact energy, a coefficient of restitution, or an impact position) of the power tool as described above. In some cases, a motor speed can increase (e.g., gradually, incrementally, or discretely) to influence impact mechanism or enhance control of power tool operation. In some cases, the motor can start at a lower speed to permit the striker 310 to gain momentum and speed up with one or more larger impacts or bursts (e.g., to provide strong forces on a workpiece).

Figure 7:
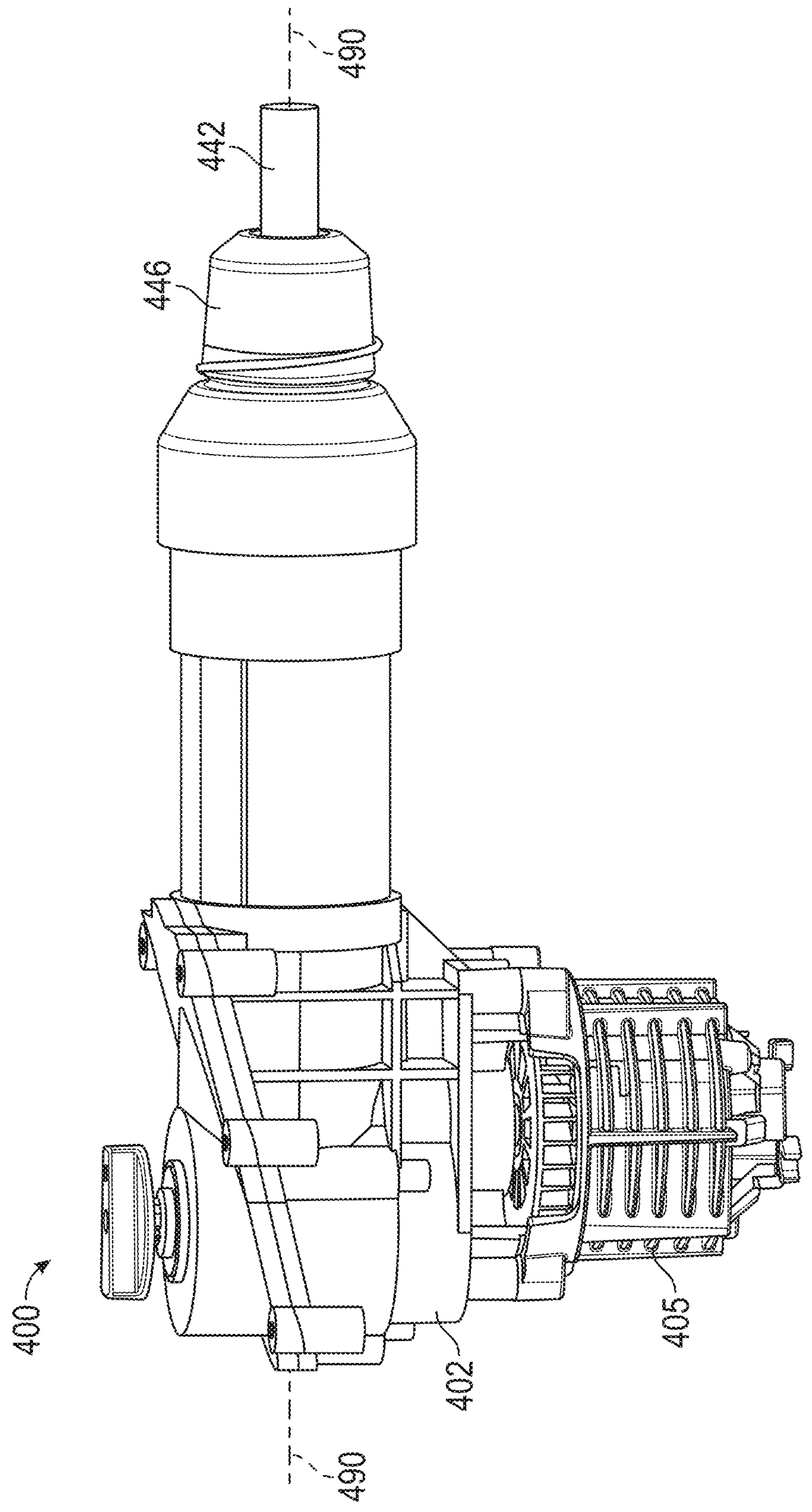
FIG. 7 is an axonometric view of a tool head of a power tool, according to aspects of the present disclosure.
Figure 8:
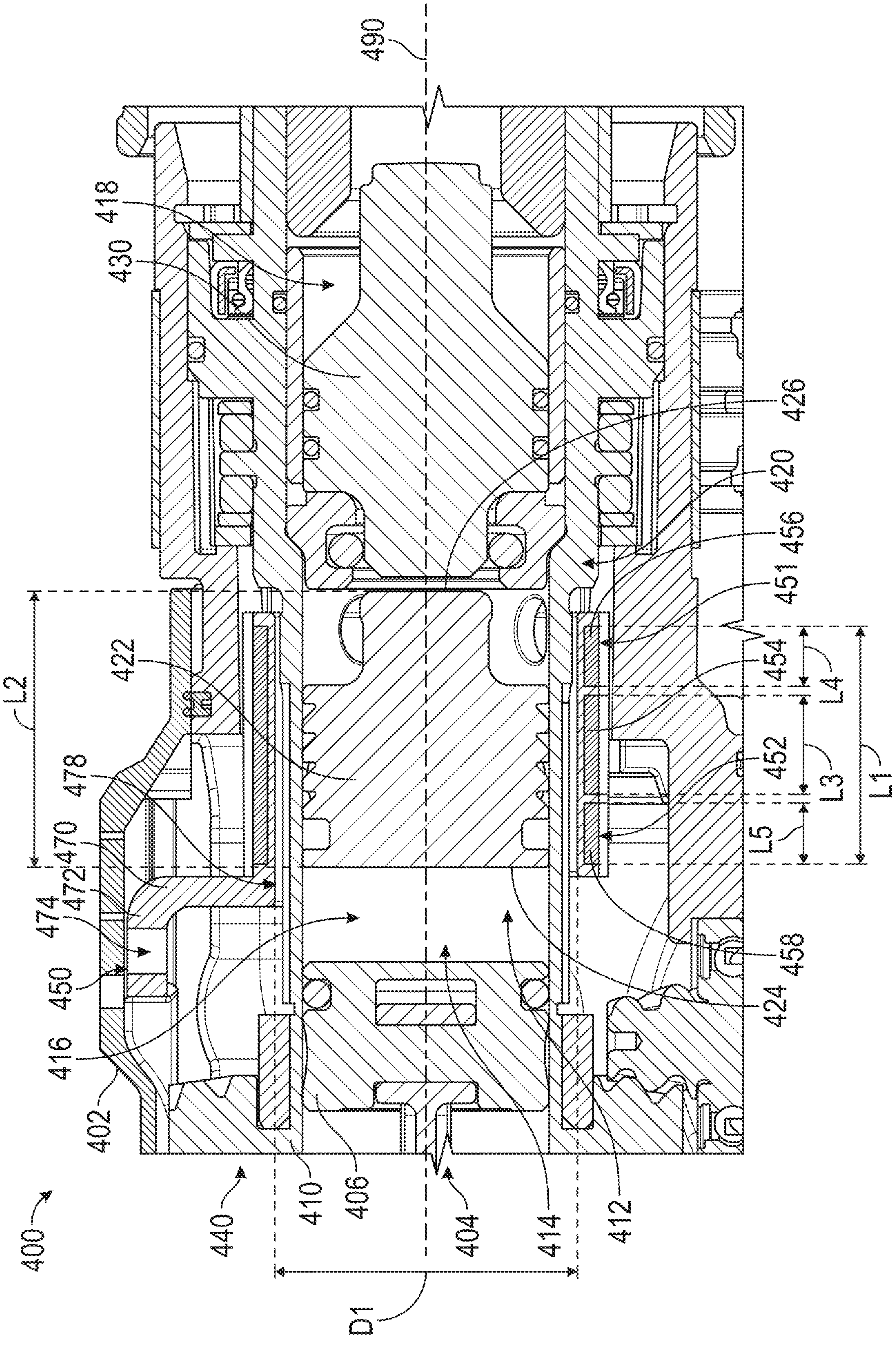
FIG. 8 is a side cross-sectional partial view the tool head of FIG. 7.

FIGS. 7 and 8 illustrate an example of a tool head 400 (e.g., an output assembly) of a power tool (e.g., a rotary hammer, a chisel hammer, a drill, etc.), which can be implemented as a particular example of a tool head of the power tool 10 of FIGS. 1 and 2 or the tool head 300 of FIGS. 3 and 4. Similar to the tool head of the power tool 10 described above, the tool head 400 can include similar components and functions to the tool head of FIGS. 1 and 2. Thus, like names to designate the same or similar components described above will be used where applicable, and discussion of these components above generally applies relative to the examples below. For example, the tool head 400 has an impact mechanism 420 just as the tool head of FIGS. 1 and 2 has the impact mechanism 26.

As shown in FIG. 7, the tool head 400 includes a gearcase 402 positioned within a tool housing and a motor 405 that is coupled to the gearcase 402. The tool head 400 further includes a spindle 410, which extends from the gearcase 402. The spindle 410 can define a drive axis 490 (e.g., a longitudinal axis), along which impacts can be provided to a tool bit 442. In some cases, the spindle 410 can rotate relative to the gearcase 402 about the drive axis 490. In the illustrated embodiment, the power tool can include a chuck 446 coupled to the spindle 410, for example, to facilitate quick removal and replacement of a tool bit 442 (e.g., a chisel, a drill bit, etc.).

Referring to FIG. 8, the power tool can further include one or more of an impact mechanism 420, a transmission 440, or a reciprocation drive assembly 404 supported within the gearcase 402. In particular, the reciprocation drive assembly 404 can engage with the motor 405 to convert torque from the motor to reciprocating motion. The reciprocation drive assembly 404 can be coupled to reciprocate the impact mechanism 420 to transfer the reciprocating motion as impact energy for performing work on a work piece. The reciprocation drive assembly 404 can be coupled to the motor via a transmission (e.g., the transmission 440) and can convert rotational motion (e.g., torque) of the motor (e.g., the motor 405) into reciprocating linear motion of the impact mechanism 420. The impact mechanism 420 can include a piston 406 that is secured to the reciprocation drive assembly 404 via the transmission 440 and a striker 422 that is moved (e.g., propelled) by the piston 406 (e.g., via compression and decompression of an air spring 414 formed therebetween). Within the spindle 410 that defines a chamber 412, the piston 406 can translate linearly along a drive axis 490 and deliver the impact energy from the reciprocation drive assembly 404 to the striker 422. The striker 422 is received within a first portion 416 of the spindle 410. The striker 422 can move linearly along the drive axis 490 and transfer the impact energy to a tool bit 442. In particular, the impact energy can be transferred to the tool bit 442 via contact with an anvil 430, which is received within a second portion 418 of the spindle 410, at a first end 424 of the striker 422. In the illustrated example, one or more of the reciprocation drive assembly 404 or the spindle 410 can be provided in a gearcase 402, although other sub-housings or a tool housing can be provided to support the reciprocation drive assembly 404 or the spindle 410.

As similarly discussed above, in some cases, a power tool can include a sensor to determine impact energy or a coefficient of restitution during operation of a power tool (e.g., the power tool 10). For example, as shown in FIG. 8, the power tool can include a sensor assembly 450, here, configured as a linear variable differential transformer (LVDT). In other examples, other types of sensors can be used including, for example, a linear distance sensor, a speed sensor, a hall effect sensor, a proximity sensor, etc. The sensor assembly 450 includes a coil assembly 451 that further include a plurality of coils 452 (e.g., current-carrying elements, Hall elements, etc.) configured to detect a movement of the striker 422 within the chamber 412. In some cases, the plurality of coils 452 can be coupled to (e.g., mounted on or wrapped around) a bobbin 470 of the sensor assembly 450. As illustrated, the bobbin 470 can be a hollow cylinder defining a hollow cylindrical bore 478. The bore 478 is coaxially aligned with the spindle 410 and is configured to receive the spindle 410 to monitor at least one of the piston 406, the striker 422, and the anvil 430. In the illustrated configuration, the sensor assembly 450 is coupled to the gearcase 402, and the plurality of coils 452 is positioned coaxially with the spindle 410. That is, the bobbin 470 can be fixed relative to a tool housing (e.g., such as the housing 14 of FIGS. 1 and 2) or the gearcase 402 and the spindle 410 can selectively rotate relative to the bobbin 470 to rotate the tool bit 442. In other configurations, the sensor assembly 450 can be supported on other parts of the tool head 400 that are stationary relative to the spindle 410. In some configurations, the sensor assembly 450 can be supported on the spindle 410 or parts of the tool head 400 that that moves relative to the gearcase 402 or the housing of the power tool.

In particular, the sensor assembly 450 includes a flange 472 (e.g., a mounting bracket) that extends (e.g., perpendicularly) from the bobbin 470 and is configured to couple the sensor assembly 450 to the gearcase 402 at a desired position. For example, the bore 478 of the bobbin 470 is defined by an inner diameter D1 that is greater than an outer diameter of the spindle 410. Thus, when the flange 472 is mounted to the tool housing or the gearcase 402, the bobbin 470 can be positioned over the spindle 410 with a radial clearance (e.g., in a floating arrangement) to allow free rotation of the spindle 410. In particular, the bobbin 470 is radially spaced from the first portion 416 of the spindle 410. Accordingly, the spindle 410 may rotate about the drive axis 490 without directly contacting the sensor assembly 450 or interfering with the sensor assembly 450. Thus, the plurality of coils 452 can track movement of the striker 422 through the spindle 410, which may be rotating, without interference. While the illustrated bobbin 470 includes one flange, a greater number of flanges (e.g., two, three, four, etc.) can be provided on a bobbin to secure a sensor assembly to a tool head. In some cases, a fastener can be provided to secure the sensor assembly 450 to the gearcase 402. For example, the fastener can be inserted through an aperture 474 of the flange 472. However, a sensor can also be secured using other methods, such as with an adhesive, press-fit connection, etc. In other examples, the sensor assembly 450 can be mounted in other ways and may not include a flange. For example, the sensor assembly 450 can be received in a corresponding recess formed in a gearcase or housing. In some examples, the radial clearance between the bobbin 470 and the spindle 410 can be adjusted to achieve a desired level of sensitivity of the sensor assembly 450. For example, the radial distance between the bobbin 470 and the spindle 410 can be decreased to increase the sensitivity of the sensor assembly 450.

With specific reference to FIG. 8, the sensor assembly 450 extends over a distance that is sufficient to track a range of movement of the striker 422. For example, the plurality of coils 452 or the sensor assembly 450 can define a length L1 as measured in a direction parallel to the drive axis 490 or a total span from the second coil to the third coil. The striker 422 can define a length L2 (e.g., a first axial length) as measured in a direction of the drive axis 490 or a distance between a first end 424 and a second end 426. In the illustrated example, the length L1 can be shorter than the length L2. In some configurations, the length L1 and the length L2 can be substantially similar, or the length L1 can be greater than the length L2. The length L2 may be sufficiently long enough to span at least a portion of each of the plurality of coils 452 (e.g., a first coil 454, a second coil 456, and a third coil 458 shown in FIG. 9), or a subset of the plurality of coils 452. In particular, the first coil 454 defines a length L3 (e.g., a second axial length), the second coil 456 defines a length L4, and the third coil 458 defines a length L5 that are each measured in a direction of the drive axis 490. In the illustrated example, the length L3 is greater than the length LA and the length L5. Further, the length L3 of the first coil 454 is less than the length L2 of the striker 422. In some cases, an axial position of the sensor assembly 450 can be adjusted toward the anvil 430 along the drive axis 490 (e.g., or other parts of a bit-end of the tool head 400). Positioning the plurality of coils 452 to cover the farthest point that the striker 422 can travel (e.g., at the first end 424) may be advantageous to provide a sensor reading with a greater accuracy or precision.

In some cases, the sensor assembly 450 can be a sensor array that includes one or more types of sensors (e.g., Hall effect sensors, current sensors, position sensors, voltage sensors, temperature sensors, torque sensors, light sensors, pressure sensors, capacitive sensors, tilt sensors, etc.). Further, the power tool can be provided with more (e.g., two, three, four, etc.) sensor assemblies to detect positions of one or more components of the power tool. In some examples, the power tool can process data from the one or more sensors to provide a more comprehensive monitoring of the tool operation or health of the power tool.

In the present example, the striker 422 can maintain a sealing interface with an inner wall of the spindle 410 during operation. The first end 424 can be oriented toward and configured to contact the anvil 430, and the second end 426 can be oriented toward the piston 406. The second end 426 can include a sealing element (e.g., an O-ring) to provide a sealing engagement with the spindle 410. Thus, the chamber 412 behind the striker 422 can remain enclosed (as the second end 426 provides the sealing interface to maintain the air spring 414 enclosed within the chamber 412) to permit the piston to translate along the drive axis 490 to pressurize the chamber 412 as desired. Accordingly, when the striker 422 is moved to be in contact with the anvil 430, one or more of the first end 424 and the second end 426 can pass or become radially aligned with the plurality of coils 452. The spindle 410 can include a relatively low electromagnetic permeability such that the plurality of coils 452 can sense movement of the striker 422 even without a cutout window, an opening, or modifications to the spindle 410. For example, a material of the spindle 410 can include electrically conductive material (e.g., aluminum, copper, tin, carbon nanotube, etc.).

Figure 9:
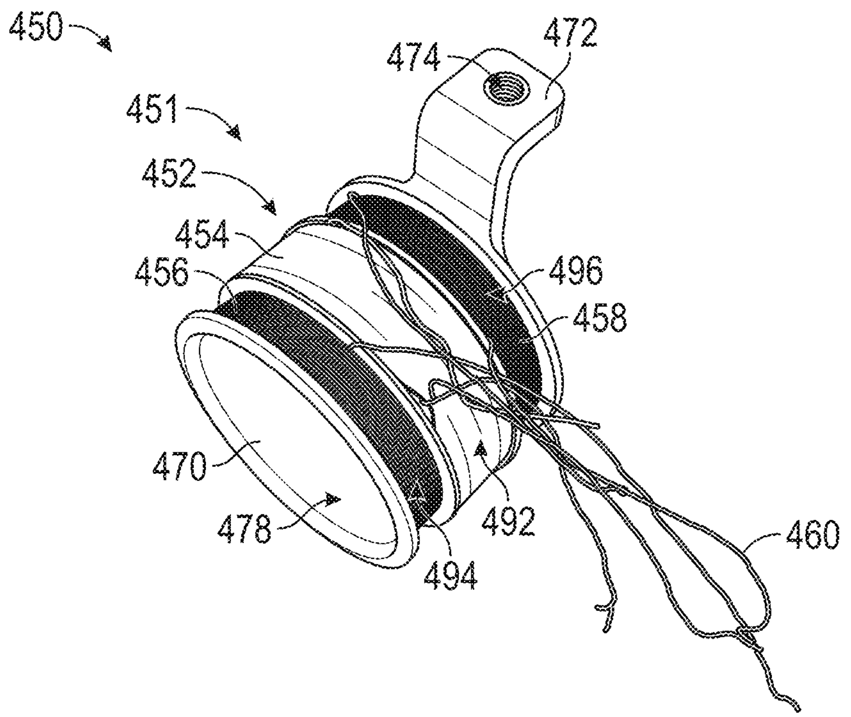
FIG. 9 is an axonometric view of a sensor assembly of the tool head of FIG. 7.

Referring to FIG. 9 and as discussed above, the plurality of coils 452 can be provided on the bobbin 470. For example, the bobbin 470 can include a plurality of coil bays that the plurality of coils 452 can be wrapped around. In particular, the plurality of coils 452 can include the first coil 454 (e.g., a primary coil) wrapped around a first bay 492, the second coil 456 wrapped around a second bay 494 (e.g., a first secondary coil), and the third coil 458 wrapped around a third bay 496 (e.g., a second secondary coil). In the illustrated example, the first bay 492 is positioned between the second bay 494 and the third bay 496. In some configurations, the first coil 454 can be primary coils that is wounded in a first rotational direction, and the second coil 456 and the third coil 458 are secondary coils that are wounded in a second rotational direction that is opposite the first rotational direction. In some examples, the second coil 456 and the third coil 458 can be electrically out of phase by 180 degrees or wired in series.

In some examples, the first coil 454, the second coil 456, and the third coil 458 can each be wrapped around the bobbin 470 for a predetermined number of turns (e.g., a first number of turns for the first coil 454, a second number of turns for the second coil 456, and a third number of turns for the third coils 458. The number of turns for each coil can be the same or different. As one example, the second and third number of turns can be the same while the first number of turns is different. Thus, when a core object (e.g., the striker 422, an object that is ferromagnetic or susceptible to magnetization, etc.) moves through the bore 478 of the bobbin 470, the plurality of coils 452 can track a movement of the core object. For example, current can be induced in the plurality of coils 452 and generate a magnetic field. When the striker 422 moves through the bore 478 and engage with the magnetic field, the striker 422 can induce a change in magnetic field and thus a change in current. Accordingly, the induced current can indicate a positional or directional movement of the striker 422. In some examples, a plurality of wires 460 can be provided to provide current to the first coil 454. In some examples, the plurality of wires 460 can be connected to a controller (e.g., such as the controller 44 of FIG. 2) to receive output voltages from the plurality of secondary coils.

Figure 10:
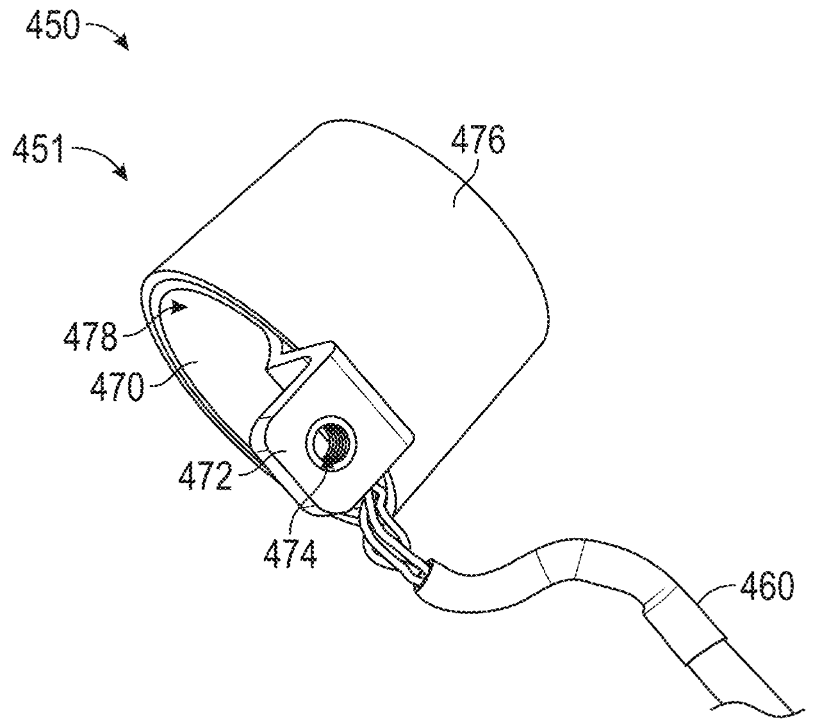
FIG. 10 is an axonometric view of the sensor assembly of FIG. 9, including a shield.

With reference to FIG. 10, the sensor assembly 450 can include a sensor shield 476 (e.g., shielding). In particular, the sensor shield 476 can be a cylindrical tube that covers the plurality of coils 452 (e.g., as shown in FIGS. 7 and 8). In the illustrated example, the flange 472 can remain uncovered and engage with the power tool to secure the sensor assembly 450 to the power tool. The sensor shield 476 can include a highly permeable material (e.g., stainless steel, carbon steel, or other types of ferrous materials, etc.). Accordingly, the sensor shield 476 can help to retain magnetic fields generated by the plurality of coils 452 inside of the sensor shield 476. Advantageously, the sensor shield 476 can enhance clear and accurate reading of output voltage that is induced by movements through the sensor assembly 450 (e.g., by reducing external electromagnetic interference). The plurality of wires 460 that are positioned underneath the sensor shield 476 can extend out of the sensor shield 476 at a distal end of the sensor assembly 450.

In some examples, various parameters of one or more components of the sensor assembly 450 can be modified based on spatial arrangement of the sensor assembly 450 within the tool head 400 or to provide an improved performance or an improved reading out output voltages of the plurality of coils 452. For example, a turn ratio (e.g., the ratio of the number of turns in the first coil 454 to either of the second coil 456 or the third coil 458) can be between about 0.1 and about 10.0, between about 0.5 and about 8.0, between about 1.0 and about 5.0, or about 2, although the turn ratio can be less than 0.1 or greater than 10.0. In some examples, a turn count of the first coil 454, the second coil 456, or the third coil 458 can be adjusted. For example, a higher turn count of one or more of the first coil 454, the second coil 456, or the third coil 458 can increase the sensor sensitivity. In some examples, portions of the second coil 456 or the third coil 458 can overlap (e.g., axially overlap) one another, or the second coil 456 or the third coil 458 can be spaced apart from the first coil 454 at a predetermined distance. In some cases, wire diameter of one or more of the first coil 454, the second coil 456, or the third coil 458 can be adjusted. For example, increasing the thickness of the sensor coils can increase a volume of material (e.g., copper) in a sensor, which may increase sensitivity of the sensor by generating a stronger magnetic field. In some cases, a diameter of the bobbin 470 can be adjusted to vary a surface area of the plurality of coils 452.

Figure 11:
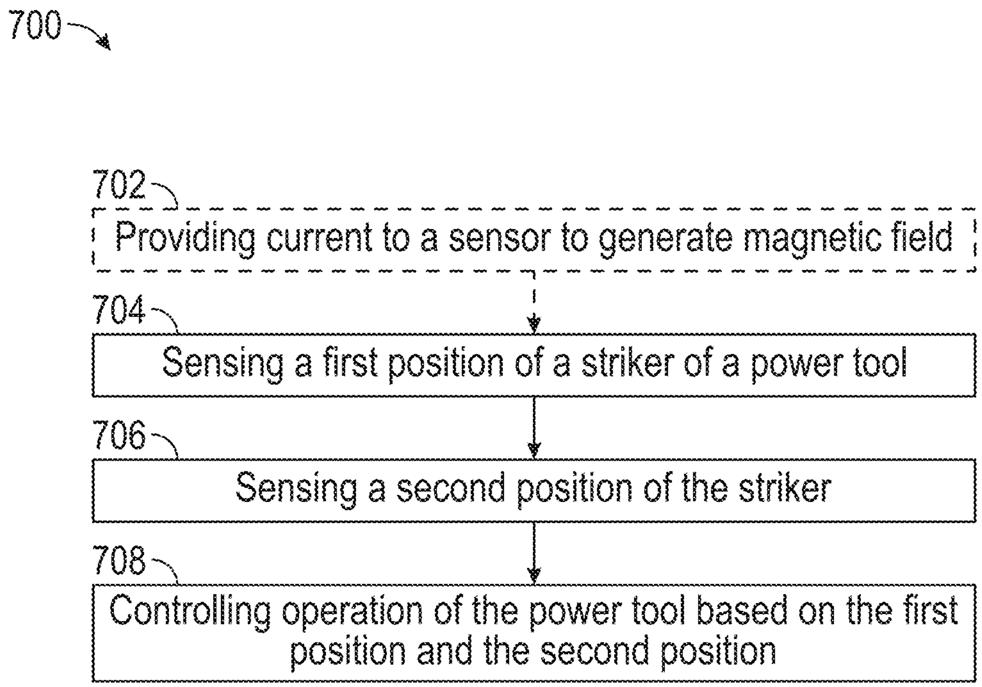
FIG. 11 is a flowchart of method of detecting positions of a striker of a power tool according to aspects of the present disclosure.

FIG. 11 is an example flowchart illustrating a method 700 for detecting positions of a striker of a power tool using a sensor assembly such as the sensor assembly 450, although other types of sensor assemblies can be used. The method 700 generally refers to FIGS. 7-10 for brevity; however, other types of power tools can be implemented to carry out the method 700. Although the flowchart illustrates blocks sequentially and in a particular order, in some examples, at least one or more blocks are executed at least partially in parallel, in another order, or bypassed.

Figure 12:
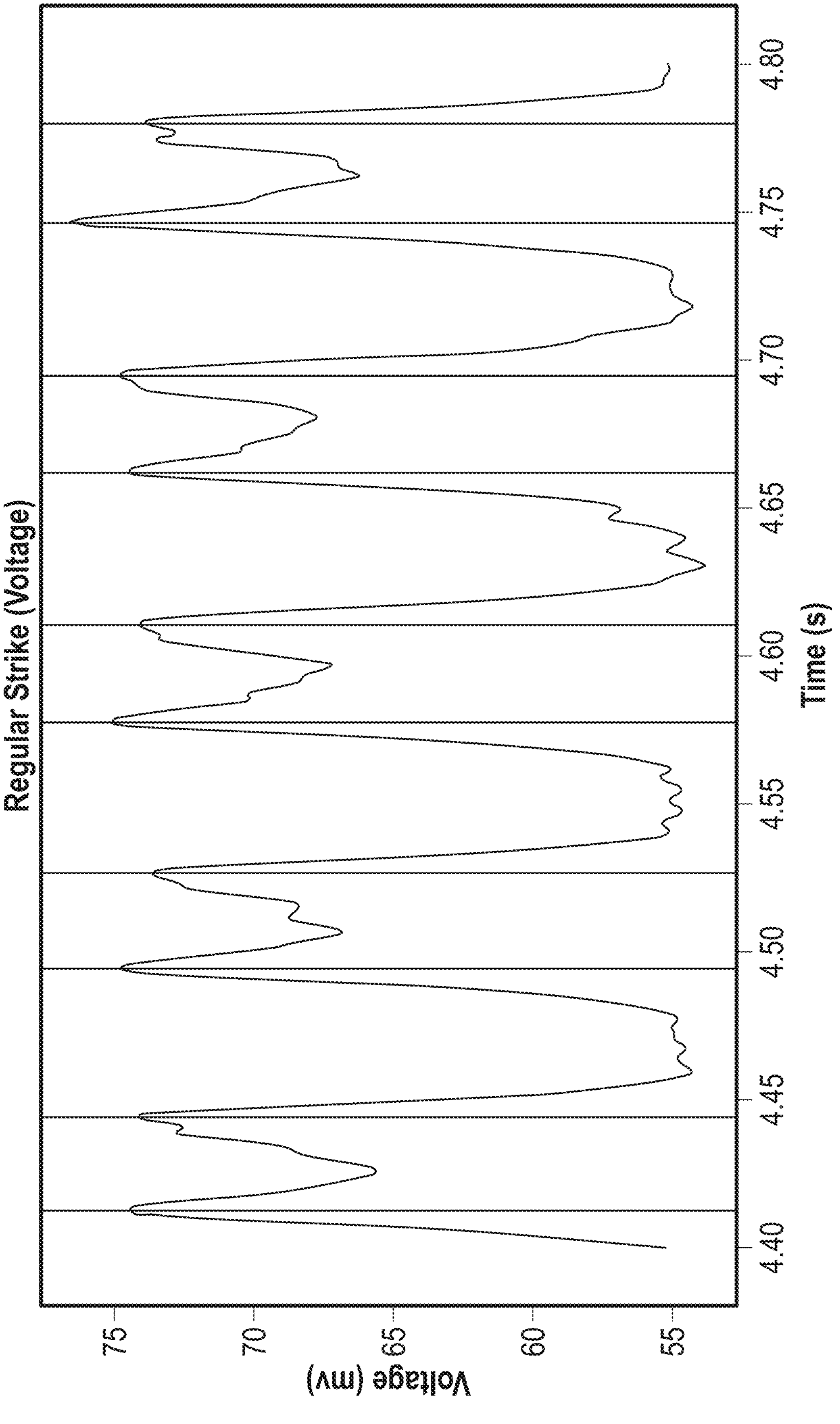
FIG. 12 is a plot illustrating changes in a voltage detected by a sensor based on a movement of a striker of a power tool.

At block 702, a current can be provided to the plurality of coils 452. For example, a continuous alternating current can be applied to the first coil 454 (e.g., through the plurality of wires 460), although direct current can be provided in some examples. In some examples, the applied current can generate a primary excitation or a varying magnetic field in the plurality of coils 452. The generated primary excitation can induce a current and voltage to be produced in the second coil 456 and the third coil 458. Correspondingly, as the striker 422 moves through the plurality of coils 452 that is energized, the striker 422 can interact with the generated magnetic field to induce a change in the existing current or voltage. Thus, the plurality of coils 452 can output a voltage (e.g., as shown in FIG. 12) that is a difference between voltages on the second coil 456 and the third coil 458, as the striker 422 moves through the magnetic flux.

Figure 13:
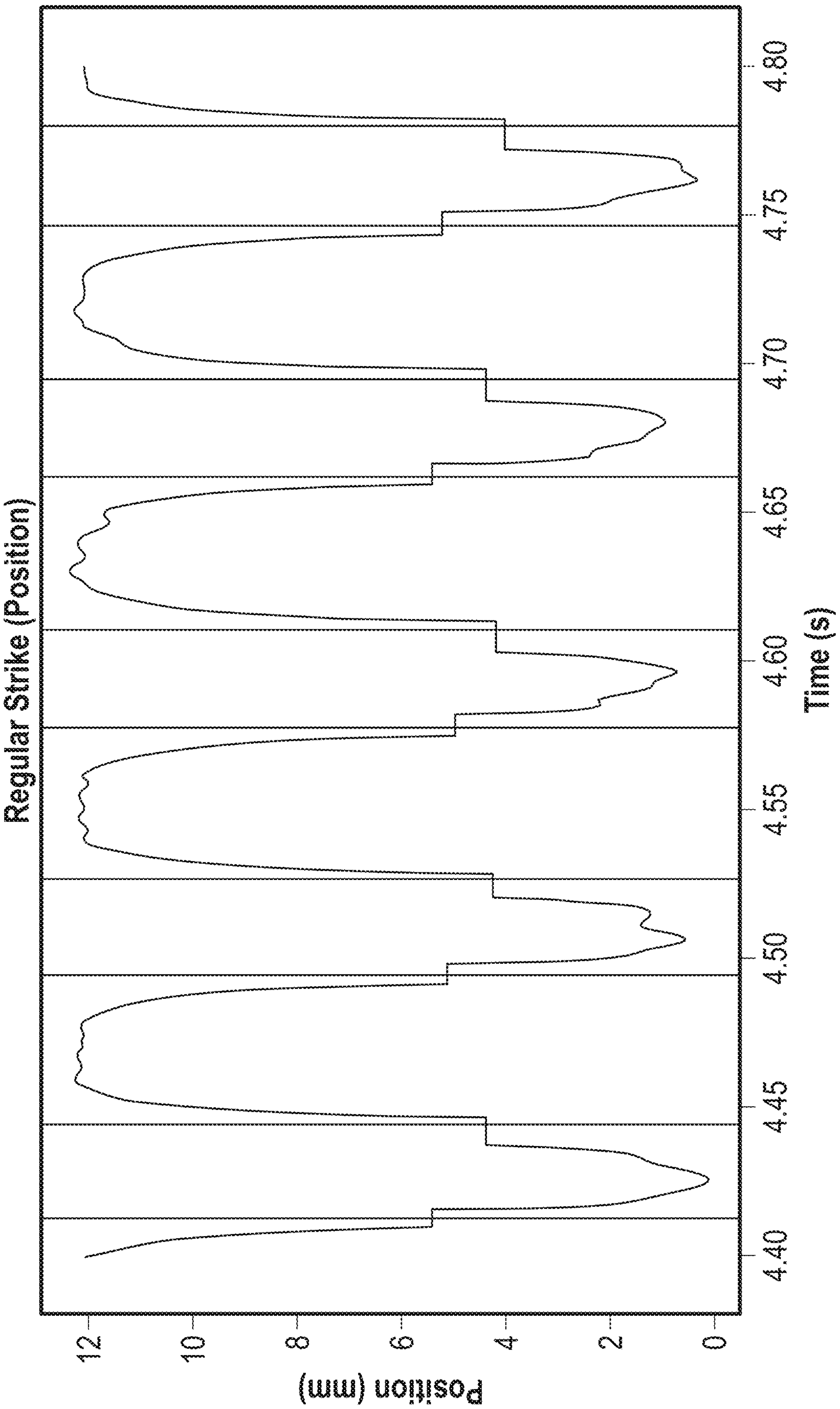
FIG. 13 is a plot illustrating a displacement of a striker of a power tool.

In particular, the output voltage can correlate to a directional motion or axial position along the drive axis 490 or velocity of the striker 422 relative to the plurality of coils 452. For example, FIG. 13 illustrates the position values that correlate to the voltage values (e.g., as shown in FIG. 12). The plurality of coils 452 uses a change in voltage between the second coil 456 or the third coil 458 to determine the presence or proximity of the striker 422 relative to the sensor assembly 450. Accordingly, a position, a displacement, or a direction of travel of the striker 422 can be determined based on the output voltage of the plurality of coils 452. Therefore, a first position or a first velocity of the striker 422 can be determined at step 704, and a second position or a second velocity of the striker 422 can be similarly determined at step 706. In some cases, a controller of the power tool can receive the output voltage and determine a directional movement, axial position, change in position over time, or velocity, of the striker 422.

At block 708, operation of the power tool can be controlled (e.g., using a controller such as the controller 44 of FIGS. 1 and 2) based on the position, velocity, or displacement (e.g., the first position and the second position) of the striker 422. In some examples, a velocity of the striker 422 before or after the impact can be determined for a period of time (e.g., between impacts, or a period of time from passing the plurality of coils 452 before the impact and after the impact, etc.) to characterize tool performance or behaviors of the impact mechanism (e.g., while the power tool is being operated). In some examples, controlling the operation of the power tool can include implementing feedback control-based algorithms to dynamically adjust operating conditions of the power tool to achieve a desired operating condition.

In some cases, pressure within the chamber 412 can be calculated based on the position of the striker 422. In some cases, a position or displacement of the striker 422 within the chamber 412 can be determined based on the position of the striker 422 and a known position of the piston 406 of the reciprocation drive assembly 404. For example, the power tool can include a sensor that tracks a position of the piston 406, or the position of the piston 406 can be determined based on a motor speed, a piston geometry, or a direct measurement of a crank gear position (e.g., via an encoder or other sensor). In some cases, an encoder on a crankshaft (e.g., the crankshaft 46 of FIG. 2, or another part of the transmission 440) can be used to determine a position of the piston 406. Correspondingly, a volume of the air spring 414 can be determined based on the travel distance of the striker 422 (e.g., between the piston 406 and the measured position of the striker 422) and an inner diameter of the spindle 410. Based on the calculated volume of the air spring 414, pressure within the chamber 412 can be determined. Advantageously, the pressure within the chamber 412 can indicate performance of the power tool and the amount of load exerted on the motor 405 of the reciprocation drive assembly. In some examples, a controller can receive pressure information to influence control of the power tool, or to provide an indication to a user about tool performance, including if maintenance is required or if an overpressure condition is reached. In some examples, the volume of the air spring 414 can be adjusted based on a desired operating condition (e.g., tool speed, impact energy, etc.) in different applications of the power tool, such as concrete drilling, masonry chiseling, demolition work, etc.

For example, impact energy can be calculated based on a mass of the striker 422 and the velocity of the striker 422. The impact energy can indicate how much kinetic energy has been conserved after the impact and help determining an amount of energy delivered to a workpiece in an impact from the bit. In some cases, kinematics of the striker 422 can depend on materials or hardness (e.g., concrete hardness) of the workpiece. Thus, the calculated impact energy can be used to modulate power delivered to the power tool to achieve a desired operating condition. In some cases, a speed of the motor 405 can be adjusted (e.g., by providing more or less power) to drive the piston 406 at a different speed. Correspondingly, the striker 422 can be propelled at a different speed to achieve a desired amount of impact energy (or an average impact energy).

This can be useful, for example, when the power tool is in a warm-up phase. For example, the power tool may be below a desired operating temperature (e.g., by being in a cold environment which can cool lubricants in the power tool or change pneumatic properties), which may decrease impact energy (e.g., due to increased losses associated with increased lubricant viscosities or contraction of air within the chamber 412). The warm-up phase may permit the power tool to warm up and operate the power tool at a desired temperature more quickly to achieve a desired impact energy level. Thus, the sensor assembly 450 can help assessing whether a desired impact energy level is being delivered and can be used to adjust a motor speed of the power tool to achieve the desired impact energy (e.g., to speed up the striker 422 to increase the impact energy). In some examples, the sensor assembly 450 or a controller that receives sensor information from the plurality of coils 452 can command or select a motor speed (e.g., via feedback control, user input, etc.) to influence the impact energy or control of the power tool.

Further, impact energy can be used to monitor wear of the power tool over time. For example, impact energy can decrease when grease dry-out occurs within the power tool as energy becomes lost to friction. In some cases, impact energy can decrease when one or more seals (e.g., an O-ring on the striker 422) wear out and decrease the pneumatic seal within the chamber 412. In some cases, a velocity or impact energy of the striker 422 can indicate whether the striker 422 is operating within a desired range. In some cases, a pressure of the chamber 412 can indicate whether the striker 422 is operating within a desired pressure range. For example, a low chamber pressure may indicate that the striker 422 and the piston 406 are moving too closely to one another, indicating the pneumatic seal between the striker 422 and the piston 406 may be undesirable. Thus, detecting the impact energy can signal an operator when it is appropriate to replace the seal or lubricate components (e.g., piston, seal, gears, etc.) to maintain or improve performance of the power tool.

Continuing, the sensor assembly 450 can detect a position of the striker 422 relative to the anvil 430 or the chamber 412. For example, when the anvil 430 is moved (e.g., shuttled) forward within the chamber 412 (e.g., when a bit is not pushed into a workpiece sufficiently to avoid dry firing), the striker 422 may need to travel farther forward. The sensor assembly 450 can sense this parked position of the striker 422 and help detecting a potential dry firing which can damage the power tool over time. Correspondingly, the sensor assembly 450 or a controller may communicate with the power tool to modulate speed of the motor 405 to adjust (e.g., decrease) energy delivered to the impact mechanism (e.g., to operate a clutch). Thus, the sensor assembly 450 can detect a parked position of the striker 422 electronically (e.g., in contrast to mechanically increasing a tool length for parking sense). With decreased amount of impact to the anvil 430 or other parts of the power tool, the tool life can be preserved or maintained.

Further, a tool mode can be determined based on one or more characteristics (e.g., an impact energy or an impact position) of the power tool as described above. In some cases, a motor speed can increase (e.g., gradually, incrementally, or discretely) to influence impact mechanism or enhance control of power tool operation. In some cases, the motor 405 can start at a lower speed to permit the striker 422 to gain momentum and speed up with one or more larger impacts or bursts (e.g., to provide strong forces on a workpiece).

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

Also as used herein, unless otherwise limited or defined, “or” indicates a non-exclusive list of components or operations that can be present in any variety of combinations, rather than an exclusive list of components that can be present only as alternatives to each other. For example, a list of “A, B, or C” indicates options of: A; B; C; A and B; A and C; B and C; and A, B, and C. Correspondingly, the term “or” as used herein is intended to indicate exclusive alternatives only when preceded by terms of exclusivity, such as “either,” “one of,” “only one of,” or “exactly one of.” For example, a list of “one of A, B, or C” indicates options of: A, but not B and C; B, but not A and C; and C, but not A and B. A list preceded by “one or more” (and variations thereon) and including “or” to separate listed elements indicates options of one or more of any or all of the listed elements. For example, the phrases “one or more of A, B, or C” and “at least one of A, B, or C” indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Also as used herein, unless otherwise defined or limited, directional terms are used for convenience of reference for discussion of particular figures or examples or to indicate spatial relationships relative to particular other components or context, but are not intended to indicate absolute orientation. For example, references to downward, forward, or other directions, or to top, rear, or other positions (or features) may be used to discuss aspects of a particular example or figure, but do not necessarily require similar orientation or geometry in all installations or configurations.

Additionally, unless otherwise specified or limited, "substantially coaxial" indicates that the described elements have axes that are substantially parallel with each other and are aligned so that extension of the axis of one of the elements intersects an axial end of another of the elements (e.g., at or within a diameter or other maximum width thereof, within 50% of a diameter or other maximum width thereof, within 25% of a diameter or other maximum width thereof, or within 5%—or less—of a diameter or other maximum width thereof).

Also as used herein, unless otherwise limited or defined, "substantially parallel" indicates a direction that is within ±12 degrees of a reference direction (e.g., within ±6 degrees or #3 degrees), inclusive. Similarly, unless otherwise limited or defined, "substantially perpendicular" similarly indicates a direction that is within ±12 degrees of perpendicular a reference direction (e.g., within ±6 degrees or ±3 degrees), inclusive. Correspondingly, "substantially vertical" indicates a direction that is substantially parallel to the vertical direction, as defined relative to the reference system (e.g., a local direction of gravity, by default), with a similarly derived meaning for "substantially horizontal" (relative to the horizontal direction). Discussion of directions "transverse" to a reference direction indicate directions that are not substantially parallel to the reference direction. Correspondingly, some transverse directions may be perpendicular or substantially perpendicular to the relevant reference direction.

Also as used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Additionally, unless otherwise specified or limited, the terms "about" and "approximately," as used herein with respect to a reference value, refer to variations from the reference value of ±15% or less, inclusive of the endpoints of the range. Similarly, the term "substantially equal" (and the like) as used herein with respect to a reference value refers to variations from the reference value of less than ±10%, inclusive. Where specified, "substantially" can indicate in particular a variation in one numerical direction relative to a reference value. For example, "substantially less" than a reference value (and the like) indicates a value that is reduced from the reference value by 10% or more, and "substantially more" than a reference value (and the like) indicates a value that is increased from the reference value by 10% or more.

Also as used herein, unless otherwise limited or specified, "substantially identical" refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

Unless otherwise specifically indicated, ordinal numbers are used herein for convenience of reference, based generally on the order in which particular components are presented in the relevant part of the disclosure. In this regard, for example, designations such as "first," "second," etc., generally indicate only the order in which a thus-labeled component is introduced for discussion and generally do not indicate or require a particular spatial, functional, temporal, or structural primacy or order.

In some embodiments, aspects of the invention, including computerized implementations of methods according to the invention, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically or operated controller to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media. Some embodiments of the invention can include or utilize a control device (or controller) such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). In some embodiments, a control device can include a centralized hub controller that receives, processes and (re) transmits control signals and other data to and from other distributed control devices (e.g., an engine controller, an implement controller, a drive controller, etc.), including as part of a hub-and-spoke architecture or otherwise.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the disclosed technology, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular examples of the disclosed technology. Further, in some examples, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," "device," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

The previous description of the disclosed embodiments is provided to enable any person skilled in the art to make or use the invention. Given the benefit of this disclosure, various modifications to these embodiments will be readily apparent to those skilled in the art, and the principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A method of detecting positions of a striker for a rotary impact tool, the method comprising:
- determining a first position of the striker before impacting an anvil of the rotary impact tool along an axial direction of the rotary impact tool;
- determining a second position of the striker after impacting the anvil along the axial direction; and
- controlling operation of the rotary impact tool based on the first position and the second position, the first position or the second position determined by generating a magnetic field that the striker passes through as a spindle of the rotary impact tool rotates about an axis that extends in the axial direction, and detecting a change in the magnetic field.

2. The method of claim 1, wherein generating the magnetic field includes producing an output voltage that is associated with the first position or the second position.

3. The method of claim 1, wherein controlling the operation includes calculating an impact energy of the striker based on the first position and the second position.

4. The method of claim 2, wherein controlling the operation includes modulating power to an impact mechanism of the rotary impact tool to propel the striker.

5. The method of claim 1, wherein determining the first position of the striker or the second position of the striker includes detecting the first position or the second position, respectively, relative to time.

6. The method of claim 1, further comprising determining pressure within the spindle that the striker is positioned within.

7. A power tool comprising:
- a spindle;
- a piston that reciprocates within the spindle;
- a striker movably received within the spindle to form an air spring with the piston, the striker reciprocating in response to reciprocation of the piston; and
- a sensor positioned around the spindle so that the spindle rotates relative to the sensor, the sensor detecting the striker as the striker reciprocates within the spindle.

8. The power tool of claim 7, wherein the sensor includes a bobbin and a plurality of coils wrapped on the bobbin, the bobbin defining a bore that receives the spindle.

9. The power tool of claim 8, wherein the bore defines an inner diameter that is greater than an outer diameter of the spindle, the spindle rotating relative to the sensor within the bore.

10. The power tool of claim 8, wherein the plurality of coils includes a first coil that is wrapped on the bobbin in a first rotational direction and one or more of:
- a second coil that is wrapped on the bobbin in a second rotational direction that is opposite the first rotational direction; or
- a third coil that is wrapped on the bobbin in the second rotational direction.

11. The power tool of claim 10, wherein the plurality of coils includes the second coil and the third coil; and
- wherein the first coil is positioned between the second coil and the third coil.

12. The power tool of claim 11, wherein the striker defines a first axial length and the first coil defines a second axial length that is less than the first axial length.

13. The power tool of claim 10, wherein a turn ratio of the first coil to at least one of the second coil and the third coil is between about 0.1 and about 10.0.

14. The power tool of claim 8, wherein the sensor includes a shield that is configured to cover the plurality of coils.

15. The power tool of claim 7 further comprising a controller configured to determine at least one of an impact energy of the striker and a pressure within the spindle based on at least one of a detected position and a detected velocity of the striker detected by the sensor.

16. A power tool comprising:
- a housing;
- a motor disposed in the housing;

a spindle coupled to the housing and defining a longitudinal axis;

a reciprocation assembly driven by the motor and including a striker movably received within a first portion of the spindle;

an anvil movably received in a second portion of the spindle, the anvil moving along the longitudinal axis to contact the striker; and a sensor coupled to the housing and coaxially aligned with the spindle, the spindle rotating relative to the sensor, and the sensor being radially spaced from the first portion of the spindle and configured to detect movement of the striker along the longitudinal axis.

17. The power tool of claim 16, wherein the sensor generates a magnetic field and the striker induces a change in the magnetic field as the striker passes through the magnetic field.

18. The power tool of claim 17, wherein the change in the magnetic field produces an output voltage at the sensor that corresponds to a position of the striker along the longitudinal axis.

* * * * *